United States Patent [19]

Kido

[11] Patent Number: 5,857,146
[45] Date of Patent: Jan. 5, 1999

[54] CIRCUIT AND METHOD FOR CONTROLLING A TIMING OF INTERMITTENT RECEPTION IN RADIO EQUIPMENT

[75] Inventor: Toru Kido, Tokyo, Japan

[73] Assignee: NEC Corporation, Tokyo, Japan

[21] Appl. No.: 567,230

[22] Filed: Dec. 5, 1995

[30] Foreign Application Priority Data

Dec. 16, 1994 [JP] Japan .................................. 6-313564

[51] Int. Cl.⁶ .................................................. H04B 7/00
[52] U.S. Cl. ........................ 455/38.3; 455/38.2; 455/343
[58] Field of Search ................................. 455/38.3, 38.2, 455/343; 340/825.44, 825.2; 370/311; 375/369

[56] References Cited

U.S. PATENT DOCUMENTS

| | | | |
|---|---|---|---|
| 5,325,088 | 6/1994 | Willard et al. | 340/825.44 |
| 5,355,518 | 10/1994 | Kindinger et al. | 455/38.3 |
| 5,440,298 | 8/1995 | Kuramatsu | 455/38.3 |
| 5,448,756 | 9/1995 | DeLuca et al. | 455/38.3 |
| 5,606,742 | 2/1997 | Kido | 455/38.3 |
| 5,678,227 | 10/1997 | Connell et al. | 455/38.3 |

FOREIGN PATENT DOCUMENTS

4355524  12/1992  Japan .

*Primary Examiner*—Nguyen Vo
*Assistant Examiner*—Sam Bhattacharya
*Attorney, Agent, or Firm*—Whitham, Curtis & Whitham

[57] ABSTRACT

In a radio equipment which establishes synchronism with a radio signal by detecting a synchronizing signal included in the radio signal and performs intermittent reception of the radio signal until the synchronizing signal is detected, an ON time for a radio section is set longer than a transmission cycle of the synchronizing signal when the radio equipment is provided at a position where reception of the radio signal is possible. On the other hand, when the radio equipment is provided at a position where reception of the radio signal is impossible, the ON time for the radio section is set shorter. After setting the ON time for the radio section shorter, the ON time for the radio section is further set shorter if the radio equipment is still provided at a position where reception of the radio signal is impossible.

18 Claims, 8 Drawing Sheets

| | "ON" TIME FOR RADIO SECTION 2 | "OFF" TIME FOR RADIO SECTION 2 | NUMBER OF MODE CONTINUATION |
|---|---|---|---|
| FIRST MODE | 30 SECONDS | 1 MINUTE | 2 CYCLES |
| SECOND MODE | 15 SECONDS | 45 SECONDS | 5 CYCLES |
| THIRD MODE | 3 SECONDS | 30 SECONDS | 10 CYCLES |

CIRCUIT AND METHOD FOR CONTROLLING A TIMING OF INTERMITTENT RECEPTION IN RADIO EQUIPMENT

BACKGROUND OF THE INVENTION

1. Field of the Invention

The present invention relates to a circuit and a method for controlling a timing of intermittent reception in radio equipment, and more particularly to a circuit and a method for controlling a timing of intermittent reception in radio equipment, which establish synchronism with a radio signal by receiving a synchronizing signal.

2. Description of the Related Art

Conventional radio equipment performs intermittent reception of a radio signal for the purpose of improving the battery saving efficiency. In the intermittent reception, the radio equipment controls to turn on a radio section and amplifies the radio signal for demodulation only when necessary information is included in the radio signal. On the other hand, when the radio signal includes no necessary information, the radio equipment controls to turn off the radio section.

As the radio equipment of this kind, for example, there has been known a portable radio terminal disclosed in Japanese patent laid-open application heisei 4-355524.

The radio equipment of this type performs intermittent reception at a timing such that only the radio signal including necessary information is received but the radio signal having no necessary information is not received. The radio terminal detects whether reception of the radio signal is enabled or not at the timing for receiving the radio signal. If reception of the radio signal is enabled for example, electrical field strength of a received signal is higher than predetermined strength, the radio terminal receives the radio signal. On the other hand, if reception of the radio signal is disabled, the radio terminal stops receiving the radio signal for a predetermined interval of time even at the timing for receiving the radio signal.

However, this radio terminal cannot receive the radio signal until a predetermined time lapses even if reception of the radio signal is again enabled in a period during which reception of the radio signal is stopped.

In particular, if this radio terminal is applied to the radio equipment which establishes synchronism with the radio signal by receiving a synchronizing signal that is repeatedly transmitted in a predetermined interval of time, reception of the synchronizing signal is delayed, resulting in a delay in establishment of synchronism with the radio signal. The radio equipment, therefore, cannot detect the information included in the radio signal until synchronism with the radio signal is established. Specifically, in a radio selective-calling receiver, since it is impossible to receive a call signal representing a call number coincident with its own call number, the radio selective-calling receiver can not carry out call annunciation.

Conventionally, in order to suppress the delay in reception of the synchronizing signal, the radio section is subjected to ON/OFF control for a predetermined time in the radio selective-calling receiver of this kind when the synchronizing signal is yet to be received. The ON/OFF control for the radio section, namely, the intermittent reception of the radio signal is called "synchro-establishment mode" and is previously set in the radio selective-calling receiver. Further, the radio selective-calling receiver controls to turn on and/or off the radio section so that only the radio signal including information which is required after reception of the synchronizing signal, namely a batch to which the radio selective-calling receiver belongs is amplified and demodulated. The ON/OFF control for the radio section, i.e., the intermittent reception of the radio signal is called "a batch reception mode" and distinguished from the synchro-establishment mode.

When a power supply is turned on, the radio selective-calling receiver performs intermittent reception of the radio signal in accordance with the predetermined synchro-establishment mode. Upon receiving the synchronizing signal obtained from the radio signal, the receiver carries out intermittent reception of the radio signal in accordance with the batch reception mode, and amplifies and demodulates only the batch to which the receiver belongs. If the call signal representing the call number coincident with its own call number is detected from this batch, the receiver performs call annunication to inform that an user is being called.

In this receiver, however, if an ON time during which the radio section is turned on in the synchro-establishment mode is set to be shorter in order to improve the battery saving efficiency, reception of the synchronizing signal is delayed. Thus, even if the call signal representing the call number coincident with its own call number is transmitted, this call signal cannot be received. Further, on the other hand, the ON time for the radio section in the synchro-establishment mode is set to be longer in order to avoid the delay in reception of the synchronizing signal, the battery saving efficiency is disadvantageously lowered.

SUMMARY OF THE INVENTION

It is therefore an object of the present invention to provide a circuit and a method for controlling a timing of intermittent reception in radio equipment which improves the battery saving efficiency and prevents the delay in reception of the synchronizing signal.

It is another object of the present invention to provide radio equipment having a plurality of synchro-establishment modes.

It is still another object of the present invention to provide radio equipment which sets a synchro-establishment mode such that the battery saving efficiency is improved when reception of a synchronizing signal is disabled.

To this end, an intermittent reception controlling circuit according to the present invention includes a receiving circuit for receiving a radio signal, a controller for performing ON/OFF control to the receiving circuit, an outputting means for outputting a plurality of ON/OFF times for the receiving circuit which relate to the ON/OFF control for the receiving circuit, and a setting circuit for setting to the controller such an ON/OFF time for a radio circuit that a battery saving efficiency is improved from a plurality of the ON/OFF times for the receiving circuit stored in the memory in the case where the receiving circuit cannot receive a predetermined signal included in the radio signal.

Further, an intermittent reception method according to the present invention includes the steps of demodulating a radio signal, detecting a predetermined signal from a demodulation signal, and setting shorter an ON time for a radio section during which a radio signal is amplified and demodulated in the case where the predetermined signal is not detected.

With the above-mentioned configurations, in the present invention, the radio signal is received in accordance with intermittent reception with a battery saving efficiency being lowered when the radio equipment is at a position where reception of the radio signal is possible, and a synchronizing signal included in the radio signal can be hence assuredly detected. On the other hand, when the radio equipment is at a position where reception of the radio signal is impossible, the OFF time for the radio section is set longer, namely, the radio signal is received in accordance with intermittent reception with a battery saving efficiency being higher, thus improving the battery saving efficiency.

BRIEF DESCRIPTION OF THE DRAWINGS

These and other objects, features and advantages of the invention will become more fully apparent from the following detailed description taken in conjunction with the accompanying drawings, wherein:

FIGS. 4 (a) and (b) are signal formats showing an example of a radio signal received by the radio equipment according to the present invention;

DETAILED DESCRIPTION OF THE PREFERRED EMBODIMENT

An embodiment of radio equipment according to the present invention will now be described using a radio selective-calling receiver as an example.

Figure 1:
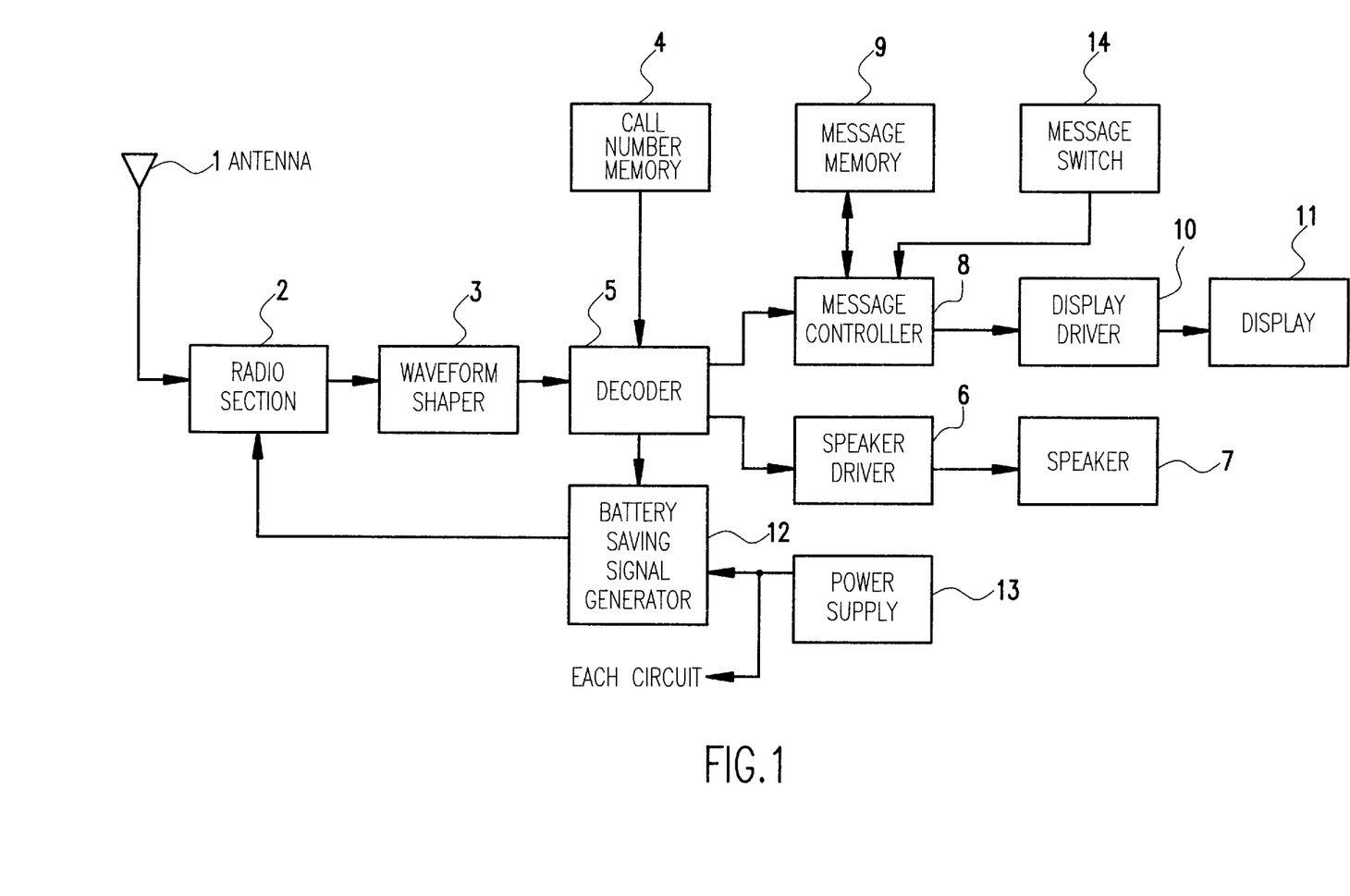
FIG. 1 is a functional block diagram of radio equipment showing an embodiment according to the present invention.

In FIG. 1, an antenna 1 receives a radio signal from a non-illustrated base station and outputs a reception signal. A radio section 2 is controlled to be turned on when a battery saving signal is at a high level, and controlled to be turned off when the battery saving signal is at a low level. Upon demodulating and amplifying the reception signal from the antenna 1, the radio section 2 outputs a demodulation signal. A waveform shaper 3 performs waveform shaping on the demodulation signal from the radio section 2 to obtain a digital signal readable by a decoder 5 and outputs the thus-obtained digital signal.

A call number memory 4 stores its own call number and outputs its own call number to the decoder 5 on the basis of addressing by the decoder 5.

The decoder 5 detects a bit synchronizing signal and a system synchronizing signal from the digital signal supplied from the waveform shaper 3 and outputs them to a battery saving signal generator 12. The decoder 5 detects a call signal from the digital signal transmitted from the waveform shaper 3 and judges whether a call number of the call signal is coincident with the receiver's own call number from the call number memory 4. If they are coincident with each other, the decoder 5 outputs a coincidence signal to a speaker driver 6. Also, the decoder 5 detects a message signal from the digital signal supplied from the waveform shaper 3 and decodes the message signal to output to a message controller 8.

The speaker driver 6 current-amplifies the coincidence signal from the decoder 5 and outputs a speaker drive signal to a speaker 7. The speaker 7 is driven by the speaker drive signal from the speaker driver 6 to perform call annunciation.

A message switch 14 is operated by a user and specifies an address of a message stored in a message memory 9. Upon correcting an error of the message from the decoder 5, the message controller 8 outputs the message to the message memory 9 and a display driver 10. The message controller 8 specifies an address of the message memory 9 in accordance with an operation of the message switch 14 to read out the stored message.

When the message from the message controller 8 is input, the display driver 10 drives a display section 11. The display 11 is driven by the display driver 10 to display the message.

A power supply 13 supplies electric power to the respective circuits including the battery saving section 12 which is turned on by a user.

A battery saving signal generator 12 establishes synchronism with the radio signal fed from the base station by receiving the bit synchronizing signal and the system synchronizing signal from the decoder 5. The battery saving signal generator sets one of a plurality of synchro-establishment modes until the bit synchronizing signal and the system synchronizing signal are input thereto, and outputs the battery saving signal in accordance with the thus-set synchro-establishment mode to perform ON/OFF control of the radio section 2. Upon receiving the bit synchronizing signal and the system synchronizing signal, the battery saving signal generator 12 sets a batch reception mode and outputs the battery saving signal in accordance with this batch reception mode to perform ON/OFF control of the radio section 2.

The battery saving signal generator 12 will now be described in detail with reference to a functional block diagram of FIG. 2.

Figure 2:
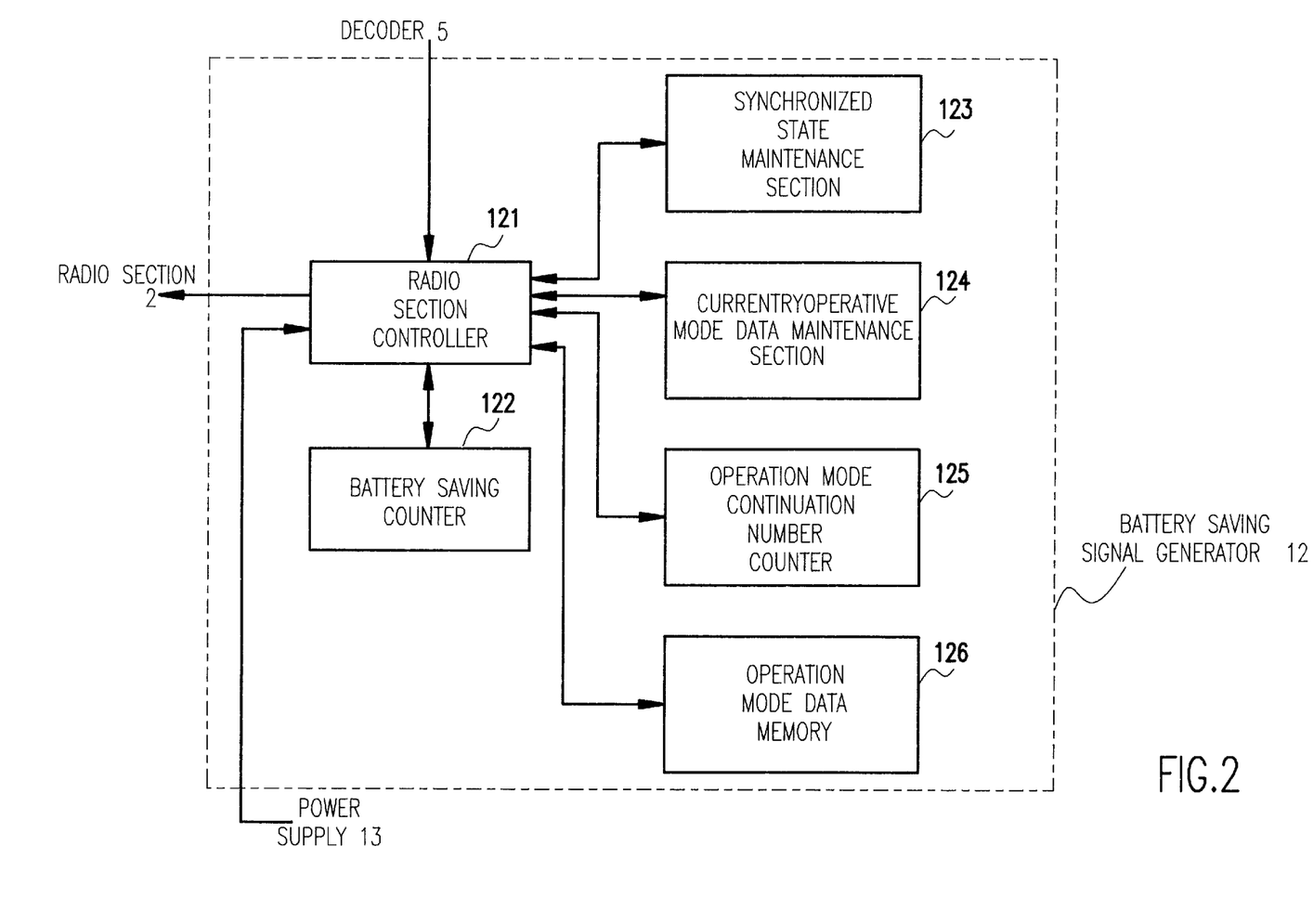
FIG. 2 is a functional block diagram of a battery saving signal generator illustrated in FIG. 1.

In FIG. 2, an operation mode memory 126 stores a plurality of the synchro-establishment modes. In this embodiment, a plurality of the synchro-establishment modes are made up of, e.g., first, second and third synchro-establishment modes, and each synchro-establishment mode is included by, e.g., first, second and third parameters. The first parameter is used to set an ON time during which the radio section 2 is turned on, and the second parameter is used to set an OFF time during which the radio section 2 is turned off. The third parameter is used to set a number of repetitions of ON/OFF control for the radio section 2 in each of the first, second and third synchro-establishment modes.

Figure 3:
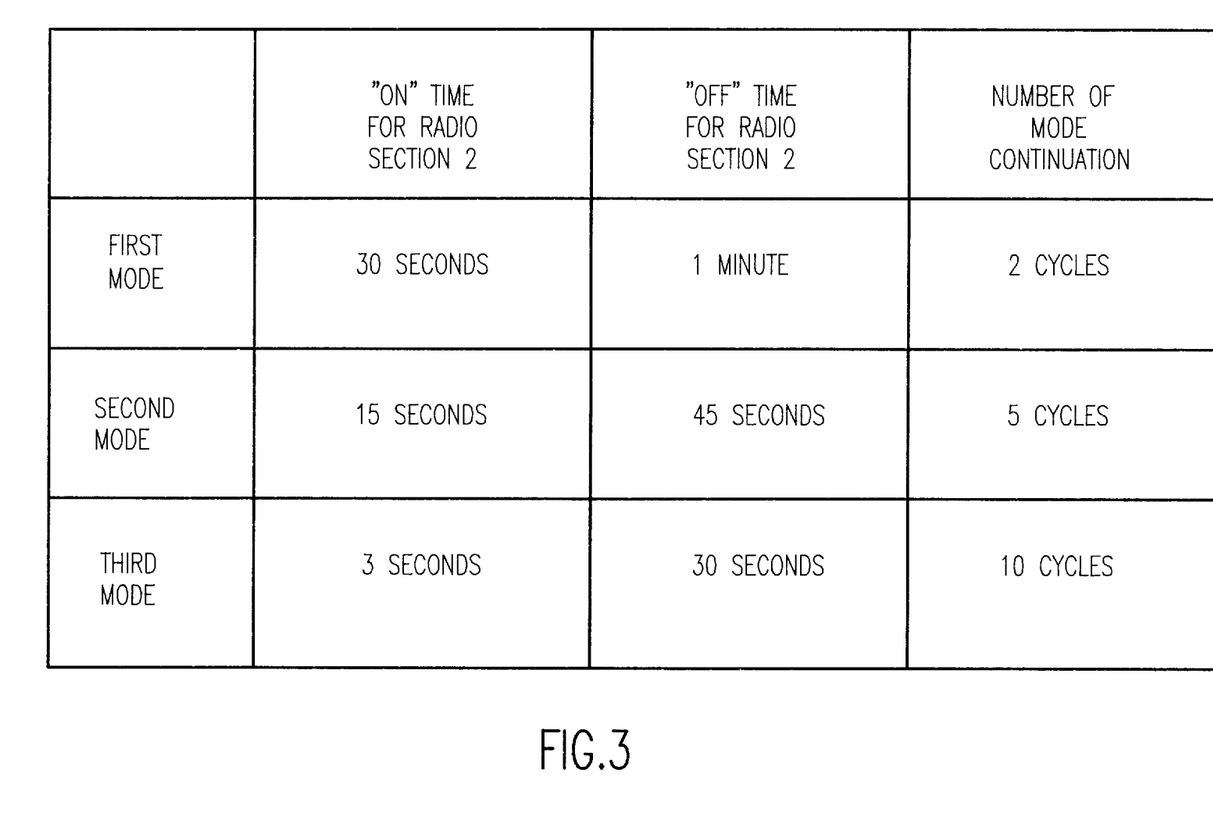
FIG. 3 is a table showing an example of parameters of a plurality of synchro-establishment modes.

A description will now be given as to a plurality of the above-mentioned synchro-establishment modes with reference to FIG. 3. Referring to FIG. 3, in the first synchro-establishment mode, the first parameter sets the "ON" time for the radio section as 30 seconds and the second parameter sets the "OFF" time for the radio section 2 as one minute. Further, in the first synchro-establishment mode, the third parameter sets a number of repetitions of ON/OFF control for the radio section 2 as two cycles.

In this embodiment, the ON/OFF control for the radio section 2 has two cycles, namely this control is repeated twice in accordance with the first synchro-establishment mode and, if the synchronizing signal is not input to a radio section controller 121 even though the ON/OFF control for the radio section 2 is repeated twice, the second synchro-establishment mode with the battery saving efficiency improved is set rather than the first synchro-establishment mode.

In the second synchro-establishment mode, the first parameter sets the "ON" time for the radio section 2 as 15 seconds while the second parameter sets the "OFF" time for the radio section 2 as 45 seconds. Further, in the second synchro-establishment mode, the third parameter sets a number of repetition of ON/OFF control for the radio section 2 as five cycles.

In the third synchro-establishment mode, the first parameter is used to set the "ON" time for the radio section 2 as three seconds and the second parameter sets the "OFF" time for the radio section 2 as 30 seconds. Furthermore, in the third synchro-establishment mode, the third parameter sets a number of repetitions of ON/OFF control for the radio section 2 as 10 cycles.

Again referring to FIG. 2, a synchronized state maintenance section 123 stores a result of a judgment of whether the synchronizing signal is input to the radio section controller 121 or not. A currently-operative mode data maintenance section 124 holds three parameters, i.e., the first, second and third synchro-establishment parameters in the currently-set synchro-establishment mode among the first, second and third synchro-establishment modes.

An operation mode continuation counter 125 is constituted by a pre-setable counter and stores the third parameter in the currently-set synchro-establishment mode, i.e., a number of repetitions of ON/OFF control for the radio section 2 by using the radio section controller 121. The operation mode continuation counter 125 counts up a number of repetitions stored and then outputs a count-up signal to the radio section controller 121. A battery saving counter section 122 is constituted by a pre-setable counter and sets a count value therein by using the radio section controller 121. The battery saving counter 122 counts the ON/OFF time for the radio section 2 by counting down the thus-set count value, and outputs a count-up signal to the radio section controller 121 when counting up.

When feeding of the power supply voltage from the power supply 13 is started, the radio section controller 121 reads out the first synchro-establishment mode from an operation mode data memory 126 and stores it in the currently-operative mode data maintenance section 124. The radio section controller 12 sets the third parameter, namely, a number of repetitions of the ON/OFF control for the radio section 2 to the operation mode continuation counter 125 in accordance with the synchro-establishment mode stored in the currently-operative mode data maintenance section 124, and sets the first parameter, namely, a count value corresponding to the "ON" time for the radio section 2 to the battery saving counter 122.

Upon receiving the bit synchronizing signal and the system synchronizing signal from the decoder 5 before reception of the count-up signal from the battery saving counter 122, the radio section controller 121 sets the count value of the battery saving counter 122 as the count value corresponding to the "OFF" time for the radio section 2 before reception of the next batch of its own on the basis of these input synchronizing signals to establish the bit synchronism and the system synchronism with the radio signals. When the count value of the battery saving counter 122 is set, the radio section controller 121 simultaneously outputs the battery saving signal at the low level to the radio section 2 to control the radio section 2 to be turned off, and stores to the synchronized state maintenance section 123 information that the synchronism with the radio signal 2 is established and the mode is changed into a batch reception mode.

In the batch reception mode, the radio section controller 121 calculates the count value which is set in the battery saving counter 122, namely, the ON/OFF time for the radio section 2, and the thus-calculated ON/OFF time for the radio section 2 is set to the battery saving counter 122. In the batch reception mode, every time the count-up signal from the battery saving counter 122 is input to the radio section controller 121, the battery saving signal is output to the radio section 2 by the radio section controller 121, and the next ON/OFF time for the radio section 2 is also set to the battery saving counter 122.

Upon receiving the count-up signal from the battery saving counter 122 before receiving the bit synchronizing signal and the system synchronizing signal from the decoder 5, the radio section controller 121 sets the count value corresponding to the "OFF" time for the radio section 2 to the battery saving counter 122 in accordance with the synchro-establishment mode stored in the currently-operative mode data maintenance section 123 and outputs the battery saving signal at the low level to the radio section 2 to turn off the radio section 2. If the radio section controller 121 receives the count-up signal from the battery saving counter 122 when the radio section 2 is turned off, the radio section controller 121 subjects the count value of the operation mode continuation counter 125 to decrement by one.

After the decrement, the radio section controller 121 judges whether the count-up signal is input from the operation mode continuation counter 125. If it is judged that the count-up signal is input, the radio section controller 122 reads out from the operation mode data memory 126 a synchro-establishment mode following an n–th (n≦3) synchro-establishment mode (referred to as a mode n hereinbelow) stored in the currently-operative mode data maintenance section 124, i.e., the first, second and third parameters of the mode n+1 and stores it in the currently-operative mode data maintenance section 123. If the mode n+1 equals to the mode 4, the radio section controller 122 reads out the first, second and third parameters of the mode 1 from the operation mode data memory 126 and stores them in the currently-operative mode data maintenance section 123.

A description will now be given as to a signal format of the radio signal received by the radio selective-calling receiver according to this embodiment with reference to FIGS. 4 (*a*) and (*b*).

Figure 4A:
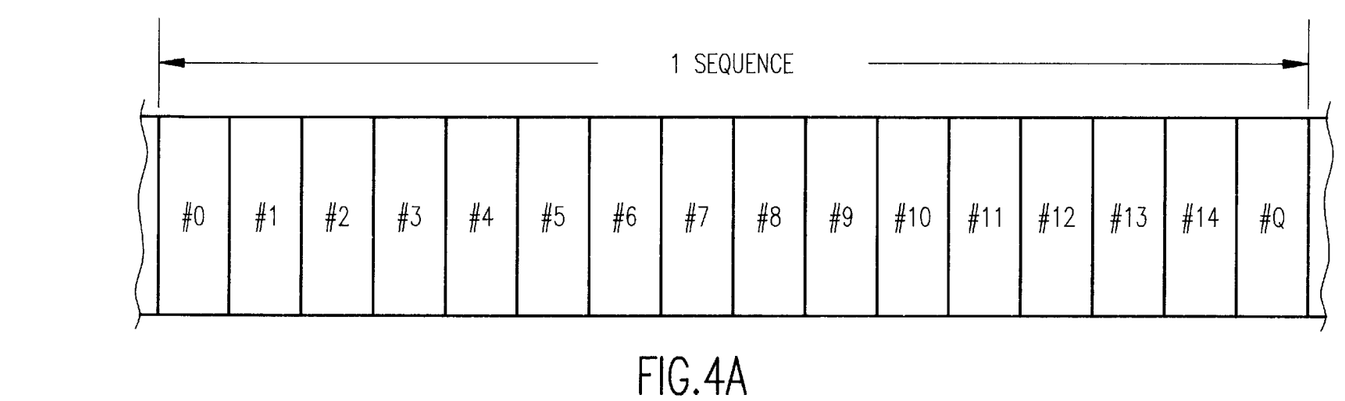
Figure 4B:
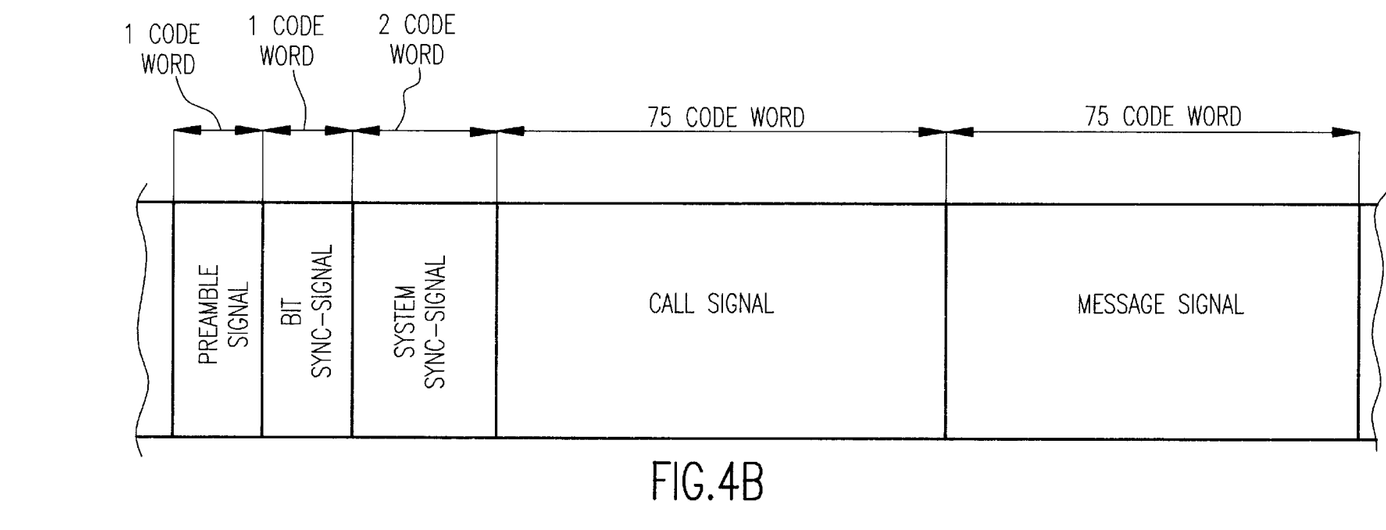

In FIG. 4(*a*), one sequence is constituted by 15 batches from a batch #0 to a batch #14. The respective batches have the same signal configuration and, for example, a preamble signal of one-code word is included at the head in the signal configuration as shown in FIG. 4(*b*). The preamble signal is made up of signals of 1 and 0 and represents the beginning of each batch. The preamble signal is followed by a bit synchronizing signal of one-code word and the system synchronizing signal of one-code word. The bit synchronizing signal is a signal for establishing the bit synchronism between the radio signal and the receiver, and the system synchronizing signal is a signal for establishing the batch synchronism between the radio signal and the receiver. The system synchronizing signal is followed by a call signal consisting of a 75-code word. The call signal includes a call number and the batch to which the receiver belongs includes a call number of the receiver. Further, the call signal is followed by a message signal consisting of a 75-code word.

The message signal includes a message for the radio selective-calling receiver. Note that a length of one batch is 739.2 msec.

An operation of the radio selective-calling receiver of this embodiment will now be explained in connection with FIGS. 5 and 6.

Figure 5:
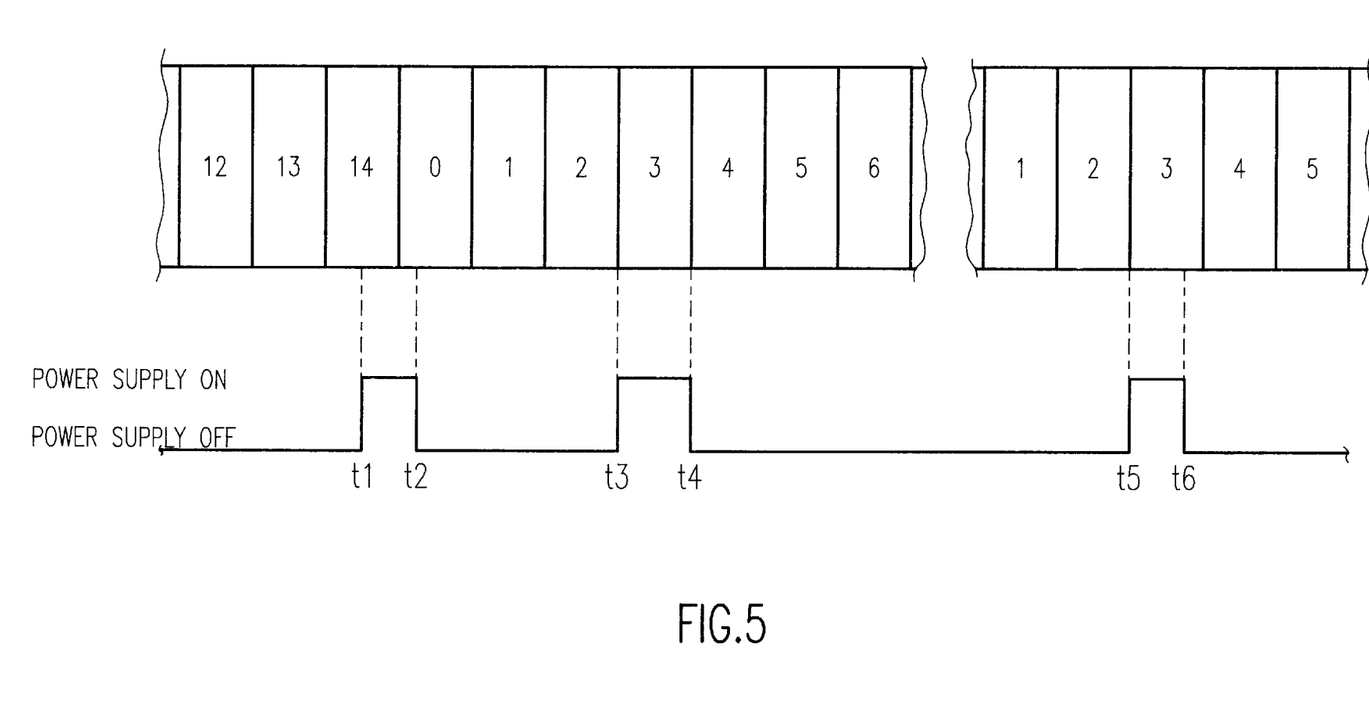
FIG. 5 is a timing chart used for explaining a timing for turning on and/or off a radio section when the radio equipment according to the present invention receives the radio signal.

In FIG. 5, at the time T1, i.e., when the power supply is turned on during transmission of the batch 14 of the radio signal, the radio section controller 121 outputs the battery saving signal to the radio section 2 to turn on the radio section 2. Further, the radio section controller 121 sets the first synchro-establishment mode (the mode 1). When the bit synchronizing signal and the system synchronizing signal which are detected from the batch 0 are input to the radio section controller 121 at the time T2, the bit synchronism and the system synchronism with the radio signal are attained, and the radio section controller 121 sets the batch reception mode.

Incidentally, the ON time for the radio section 2 is set as 30 seconds in the mode 1 and, since the one batch length is 739.2 msec, in the case where the radio section 2 is turned on, the bit synchronizing signal and the system synchronizing signal can be necessarily detected when the radio section 2 is turned on for the first time. Accordingly, the radio selective-calling receiver can assuredly establish the synchronism with the radio signal when the radio section 2 is turned on for the first time. After receiving the system synchronizing signal, the radio section controller 121 outputs the battery saving signal to the radio section 2 at the time T2 to turn off the radio section 2.

When the batch 3 to which the receiver belongs is transmitted, the radio section controller 121 outputs the battery saving signal to the radio section 2 to turn on the radio section 2 at the timing for demodulating and amplifying the batch. If its own call number is included in the batch 3, the decoder 5 decodes the message signal following the call signal. After decoding the message signal, the radio section controller 121 outputs the battery saving signal to the radio section 2 to turn off the radio section 2 at the time T4.

If the batch 3 is again transmitted at the time T5, the radio section controller 121 outputs the battery saving signal to the radio section 2 to turn on the radio section 2 at the timing for demodulating and amplifying the batch. In the case where the call number inherent to the receiver is not included in the batch 3, the radio section controller 121 outputs the battery saving signal to the radio signal 2 to turn off the radio section 2 at the time T6.

Figure 6:
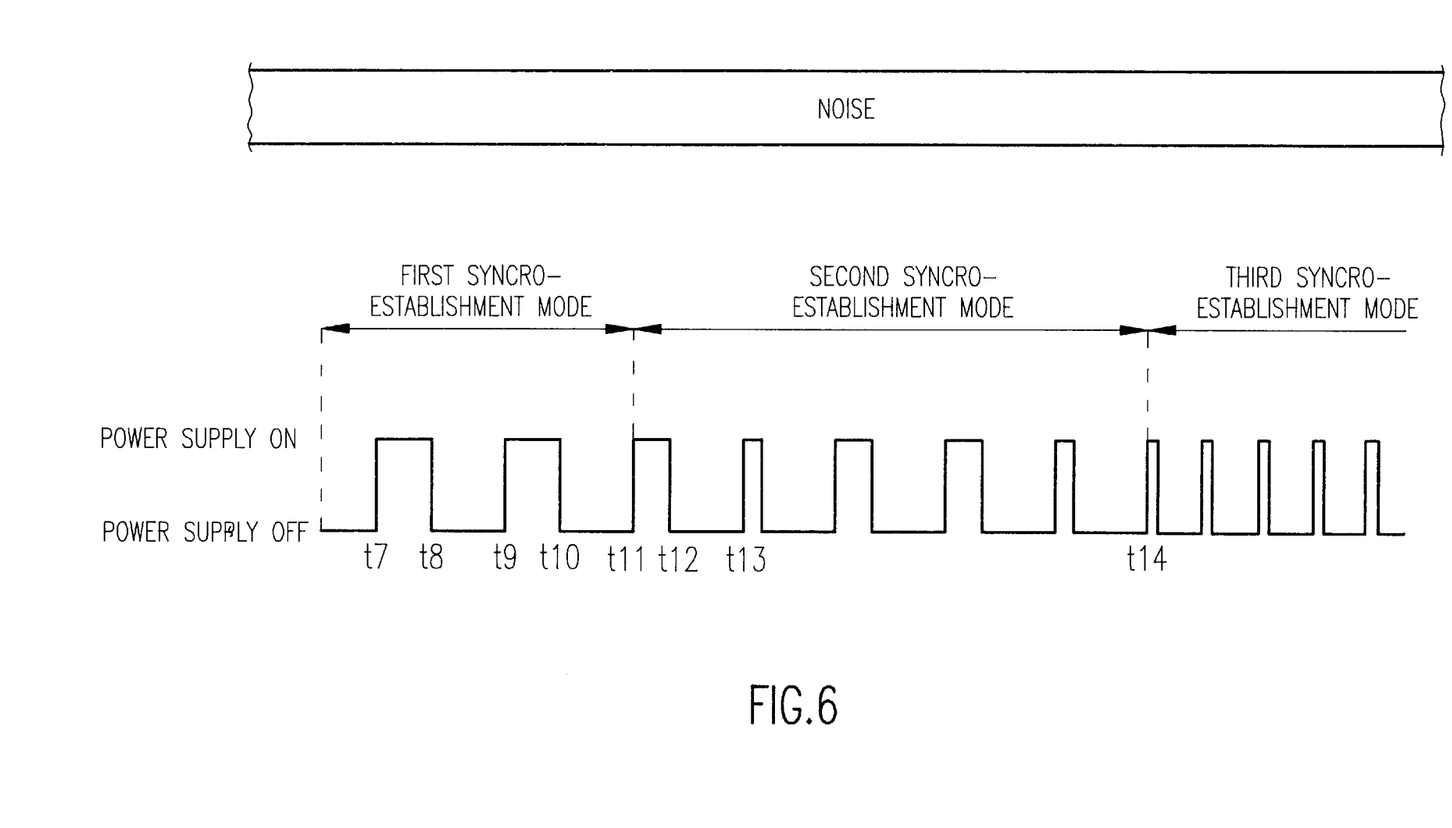
FIG. 6 is a timing chart used for explaining a timing for turning on and/or off the radio section when the radio equipment according to the present invention receives noise.

FIG. 6 shows ON/OFF control timings for the radio section 2 in the case where the radio selective-calling receiver is at a position such that reception of the radio signal from the base station is disabled.

In FIG. 6, when the power supply 13 is turned on at the time T7, the radio section controller 121 outputs the battery saving signal to the radio section 2 to turn on the radio section 2. Further, the radio section controller 121 sets the mode 1.

Since the signal received by the radio selective-calling receiver is not a radio signal from the base station but noise, the bit synchronizing signal and the system synchronizing signal from the radio signal are not input to the radio section controller 121 even when the first parameter of the mode 1, namely, the ON time for the radio section 2 lapses. The radio section controller 121 outputs the battery saving signal to the radio section 2 to turn off the radio section 2 at the time t8.

When the second parameter of the mode 1, i.e., the OFF time for the radio section 2 lapses, the radio section controller 121 subjects the count value of the operation mode continuation number counter 125 to decrement by one, and outputs the battery saving signal to the radio section 2 to turn on the radio section 2 at the time t9. Since the signal received by the radio selective-calling receiver is still noise, the bit synchronizing signal and the system synchronizing signal included in the radio signal are not input to the radio section controller 121 even when the ON time during which the radio section 2 is turned on lapses. The radio section controller 121 outputs the battery saving signal to the radio section 2 to turn off the radio section 2 at the time t10.

When the OFF time for the radio section 2 lapses, the radio section controller 121 subjects the count value of the operation mode continuation number counter 125 to decrement by one, and outputs the battery saving signal to the radio section 2 to turn on the radio section 2 at the time t11. Here, since the first parameter of the mode 1, namely, a number of repetition of the ON OFF operation for the radio section 2 equals to two cycles, the count-up signal from the operation mode continuation number counter section 125 is input to the radio section controller 121. In response to this signal, the radio section controller 121 sets the mode 2 in which the battery saving efficiency is higher than that in the mode 1.

Since the bit synchronizing signal and the system synchronizing signal from the radio signal are not input to the radio section controller 121 even when the first parameter of the mode 2, i.e., the ON time for the radio section 2 lapses, the radio section controller 121 outputs the battery saving signal to the radio section 2 to turn off the radio section 2 at the time t12.

When the second parameter, i.e., the OFF time for the radio section 2 lapses, the radio section controller 121 subjects the count value of the operation mode continuation number counter 125 to decrement by one, and outputs the battery saving signal to the radio section 2 to turn on the radio section 2 at the time t13. The signal received by the radio selective-calling receiver is still noise, and the bit synchronizing signal and the system synchronizing signal included in the radio signal are not hence input to the radio section controller 121 even if the ON time during which the radio section 2 is turned on lapses. The radio section controller 121 outputs the battery saving signal to the radio section 2 to turn off the radio section 2 at the time t13.

The same operation is thereafter repeated for five times, namely, for a number of cycles of the third parameter of the mode 2, and the battery saving signal is output to the radio section 2 to turn on the radio section 2 at the time t14. The count-up signal from the operation mode continuation number counter 125 is then input to the radio section controller 121. The radio section controller 121 sets the mode 3 whose battery saving efficiency is higher than that of the mode 2 in response to the input signal.

Thereafter, the radio section 2 is again controlled to be turned on and/or off in accordance with the thus-set mode 3. Even when the cycle of the third parameter of the mode 3 is repeated for 10 times, if the radio selective-calling receiver keeps receiving noise, the mode 1 is again set by the radio section controller 121 and the radio section 2 is controlled to be turned on and/or off.

Figure 7:
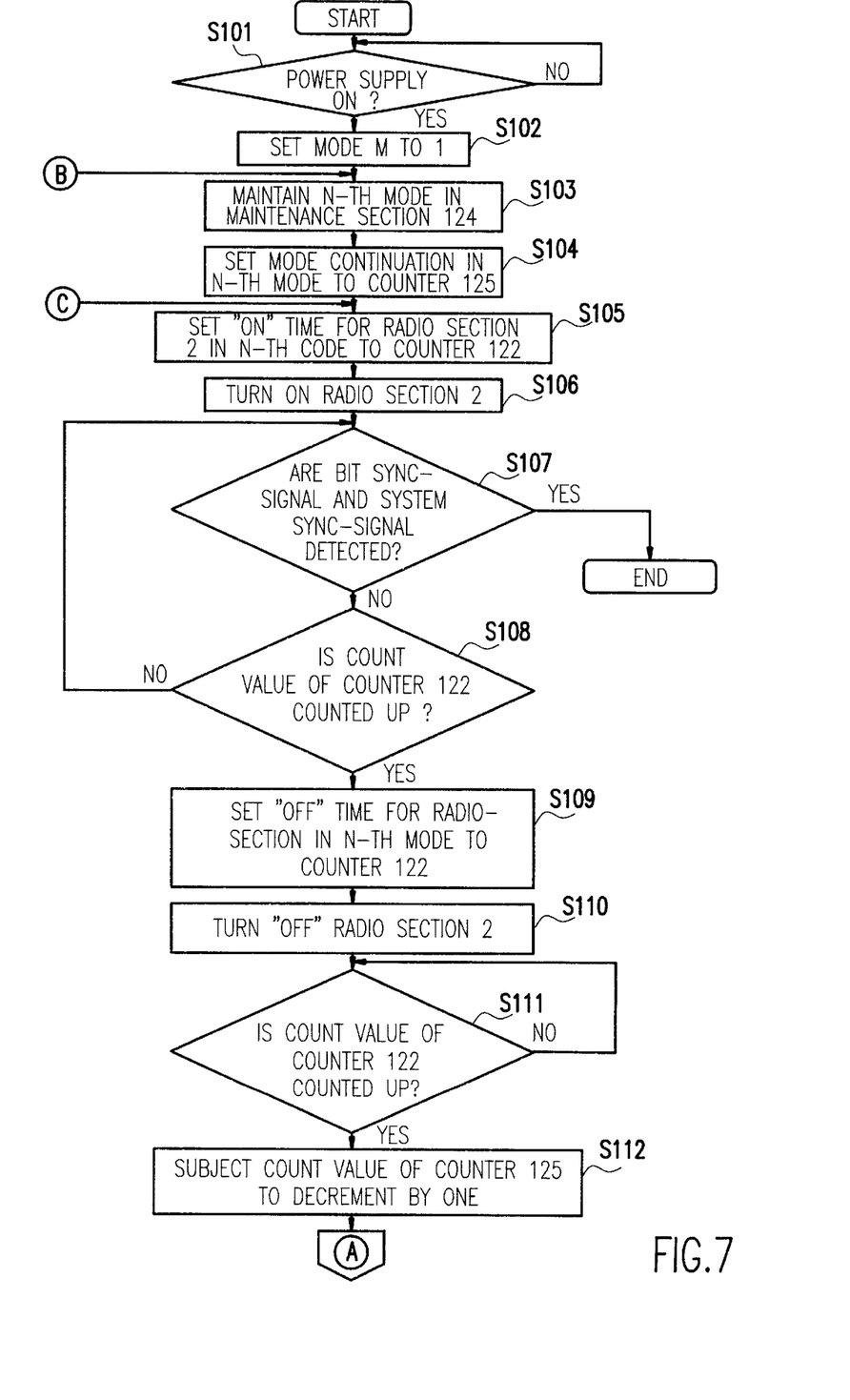
FIGS. 7 and 8 are flowcharts used for explaining a method for setting the synchro-establishment mode.
Figure 8:
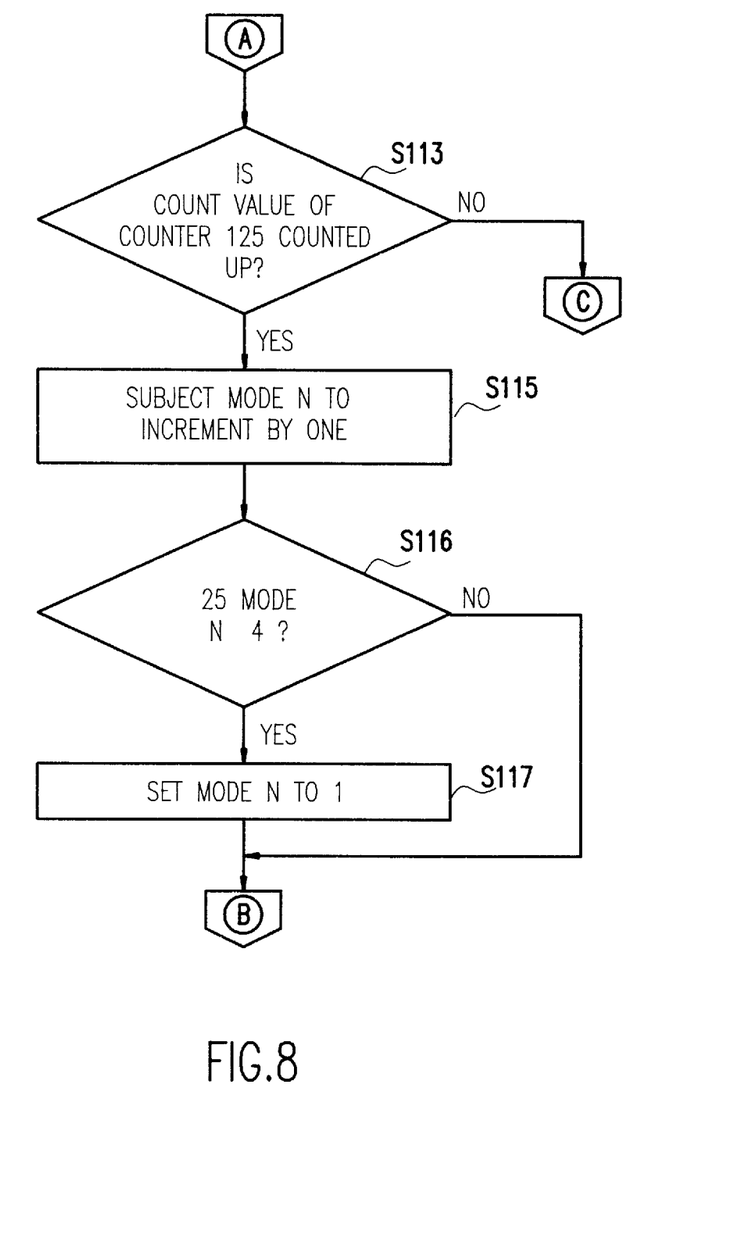

A description will now be give as to a method for setting the first to third synchro-establishment modes using the radio section controller 121 with reference to FIGS. 7 and 8.

In the first place, the judgment is made upon whether the power supply 13 is turned on by the radio section controller 121 (S101). If the power supply 13 is turned on, the radio section controller 121 reads out the first, second and third parameters of the first synchro-establishment mode from the operation mode data memory 126 (S102) and stores them in the currently-operative mode data maintenance section 16 (S102).

On the other hand, when the power supply 13 is turned off, the processing is returned to S101.

If the mode 1 is maintained by the currently-operative mode data maintenance section 16, the radio section controller 121 sets the third parameter of the mode 1, i.e., a number of mode continuation of the mode 1 to the operation mode continuation number count section 125 (S104). Further, the radio section controller 121 sets the first parameter of the mode 1, i.e., the "ON" time for the radio section 2 to the battery saving counter 122 (S105). After the setting of the battery saving counter 122 is completed, the radio section controller 121 outputs the battery saving signal at the high level to the radio section 2 to control the radio section 2 to be turned on (S106).

By turning on the radio section 2, the radio section controller 121 judges whether the bit synchronizing signal and the system synchronizing signal are input thereto through the antenna 1, the radio section 2, the waveform shaper 3 and the decoder 5 (S107). If the bit synchronizing signal and the system synchronizing signal are input to the radio section controller 121, the radio section controller 121 completes setting of the synchro-establishment mode in order to set the batch reception mode (END).

On the other hand, if the bit synchronizing signal and the system synchronizing signal are not input to the radio section controller 121, the radio section controller 121 judges whether the count-up signal from the battery saving counter 122 is input thereto (S108). If the count-up signal is not input, the processing is returned to S107.

When the count-up signal from the battery saving counter 122 is output, the second parameter of the mode 1, i.e., the count value corresponding to the "OFF" time during which the radio section 2 is turned off is set to the battery saving counter 122 by the radio section controller 121 (S109). When the setting in the battery saving counter 122 is carried out, the radio section controller 121 outputs the battery saving signal at the low level to the radio section 2 to control the radio section 2 to be turned off (S110). After the battery saving signal is output, the radio section controller 121 judges whether the count-up signal from the battery saving counter 125 is input thereto (S111). The processing of S111 is repeated until the count-up signal is input to the radio section controller 121 and, if the count-up signal is input to the radio section controller 121, the radio section controller 121 subjects the count value of the operation mode continuation number counter 125 to decrement by one (S112).

When the count value of the operation mode continuation number counter 125 is subjected to decrement by one, the radio section controller 121 judges whether the count-up signal from the operation mode continuation number counter 125 is input thereto (S113). If the count-up signal is not input to the radio section controller 121, the processing is returned to S105, while if the count-up signal is input to the radio section controller 121, the radio section controller subjects the value of the mode 1 to increment by one to obtain the mode 2 (S115).

In this embodiment, since a number of modes is just three, the value of the mode 3 cannot be subjected to increment by one to realize the mode 4 in the processing of S115. The radio section controller 121, therefore, judges whether the mode whose value is subjected to increment by one is the mode 4 (S116). If the mode is judged to be the mode 4 in the processing of S116, the mode is regarded as the mode 1 (S117) and the processing is returned to S113. Further, if the mode is not the mode 4 in the processing of S116, the processing is returned to S113.

Although the present invention has been described as a radio selective-calling receiver which establishes the synchronism with the radio signal by receiving the synchronizing signal, the aim of the present invention is to perform intermittent reception so that the battery saving efficiency is improved when a specific signal cannot be received in the radio equipment which carries out intermittent reception at a timing for receiving only the specific signal, and the present invention is not hence restricted to the radio selective-calling receiver for establishing the synchronism.

Further, although a number of modes in the synchro-establishment mode has been described as three in this embodiment, the present invention of course does not limit a number of modes.

Furthermore, an example of the signal format of the radio signal received by the radio selective-calling receiver has been explained with reference to FIG. 4, but the signal format of the radio signal is not restricted to a certain type in the present invention.

As mentioned above, in the present invention, reception of the synchronizing signal is enabled by just turning on the radio section once when the radio receiver is provided at a position where reception of the radio signal from the base station is possible, and the time during which the radio section is turned on and/or off in intermittent reception is varied so that battery saving efficiency is improved when the radio receiver is provided at a position where reception of the radio signal is impossible, thus preventing the delay in reception of the synchronizing signal and improving the battery saving efficiency.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A circuit for controlling intermittent reception of radio equipment having receiving means for receiving a radio signal, said circuit comprising:

controlling means for performing ON/OFF control for said receiving means;

outputting means for outputting a plurality of ON/OFF times during which said receiving means is turned on and/or off which are related to the ON/OFF control for said receiving means; and setting means for setting to said controlling means an ON/OFF time having a shorter ON time among a plurality of said ON/OFF times for said receiving means stored in a memory when said receiving means cannot receive a predetermined signal included in said radio signal, and said setting means including initial setting means for setting, in response to turning-on of a power supply to said controlling means an ON time for said receiving means which is longer than a cycle in which said predetermined signal is repeatedly transmitted from a plurality of said ON/OFF times for said receiving means stored in said memory.

2. The circuit as claimed in claim 1, wherein said receiving means comprises:

an antenna for receiving said radio signal;

radio means for amplifying and demodulating said radio signal received by said antenna; and detecting means for detecting a synchronizing signal included in a demodulation signal from said radio means as the predetermined signal.

3. The circuit as claimed in claim 2, wherein said setting means comprises setting changing means for setting to said controlling means a second ON/OFF time having an ON time shorter than that of a first ON/OFF time when said detecting means cannot detect said synchronizing signal during a predetermined time after said first ON/OFF time for said receiving means is set to said controlling means.

4. The circuit as claimed in claim 3, wherein said setting changing means comprises a first counter for counting a predetermined time as a number of repetitions of ON/OFF control for said receiving means.

5. The circuit as claimed in claim 1, wherein said controlling means comprises a second counter for counting said ON/OFF time for said receiving means set by said setting means.

6. The circuit according to claim 1, wherein when said receiving means does not receive said predetermined signal included in said radio signal during an "ON" time of an ON/OFF time of a first mode, said setting means sets an ON/OFF time having a smaller ratio of ON time to OFF time which has a shorter ON time period.

7. The circuit according to claim 1, wherein said setting means sets to said controlling means a shorter ON time of an ON/OFF time of said plurality of ON/OFF times as said receiving means continues not to receive said predetermined signal, wherein said setting means sets said controlling means into one of a plurality of different, sequential modes as said receiving means continues not to receive said predetermined signal, such that a mode of said plurality of modes has a shorter ON time of said receiving means than a subsequent mode of said plurality of modes.

8. A radio selective-calling receiver comprising:

radio means for outputting a demodulation signal after demodulating a radio signal;

synchronizing signal detecting means for detecting a synchronizing signal from said demodulation signal;

detecting means for detecting a predetermined call number from said demodulation signal;

call annunciating means for performing call annunciation in the case where said predetermined call number is detected; and controlling means which selects an ON/OFF time for said radio means having a shorter ON time than that in the case where reception of said synchronizing signal is disabled when said radio means is turned on and then performs ON/OFF control to said radio means and said controlling means including initial controlling means which selects an ON time for said radio means which is longer than a cycle in which predetermined signal is repeatedly transmitted from a plurality of the ON/OFF times for said radio means stored in said ON/OFF time memory and performs ON/OFF control to said radio means in response to turning-on of a power supply.

9. The radio selective-calling receiver claimed in claim 8, further comprising:

a ON/OFF time memory for storing a plurality of ON/OFF times for said radio means; and a repetition number memory for storing a predetermined number of repetitions of said ON/OFF time for said radio means stored in said ON/OFF time memory.

10. The radio selective-calling receiver as claimed in claim 9, wherein said setting changing means comprises a first counter for counting a predetermined number of repetitions stored in said repetition number memory.

11. The radio selective-calling receiver as claimed in claim 10, wherein said controlling means comprises setting changing means which selects an ON/OFF time for said radio means having a shorter ON time from a plurality of said ON/OFF times for said radio means stored in said ON/OFF time memory, and performs ON/OFF control to said radio means in the case where said synchronizing signal detecting means cannot detect said synchronizing signal even when said first counter counts up.

12. The radio selective-calling receiver as claimed in claim 8, wherein said controlling means comprises a second counter for counting an ON/OFF time for said radio means which is selected by said controlling means.

13. The radio selective-calling receiver as claimed in claim 8, further comprising:

message detecting means for detecting a message from said demodulation signal;

a message memory for storing said message; and display means for displaying said message.

14. The radio selective-calling receiver as claimed in claim 13, further comprising a message switch for requesting display of a message stored in said message memory onto said display means.

15. The circuit according to claim 8, wherein said controlling means includes means for decreasing a ratio of ON time to OFF time, when said radio means does not receive a predetermined signal in said radio signal.

16. The receiver according to claim 8, wherein said setting means sets said controlling means to a shorter ON time of an ON/OFF time of a plurality of ON/OFF times as said reception of said synchronizing signal continues to be disabled, and wherein said controlling means controls said radio means in a plurality of different, sequential modes as said reception of said synchronizing signal continues to be disabled, such that a mode of said plurality of modes has a shorter ON time of said radio means than a subsequent mode of said plurality of modes.

17. A method for controlling intermittent reception in a radio receiver, comprising the steps of:

initializing said radio receiver with an ON time that is longer than a cycle in which a predetermined signal is repeatedly transmitted;

demodulating a radio signal;

detecting said predetermined signal from said demodulation signal;

setting said ON time for said radio receiver during which said radio signal is amplified and demodulated to be shorter in the case where said predetermined signal is not detected; and setting said radio receiver into one of a plurality of different, sequential modes as said predetermined signal continues not to be received, such that a mode of said plurality of modes has a shorter ON time of said radio receiver than a subsequent mode of said plurality of modes.

18. The method for controlling intermittent reception in a radio receiver as claimed in claim 17, wherein the step of setting comprises steps of:

detecting whether said radio receiver is turned on for a currently-set ON time at a predetermined number of times; and setting said ON time for said radio receiver to be shorter in the case where said radio receiver is turned on for a currently-set ON time at a number of times and said predetermined signal is not detected.

* * * * *